May 7, 1940.  H. BOHMER, JR., ET AL  2,200,212
GASKET
Filed Oct. 25, 1939   2 Sheets-Sheet 1
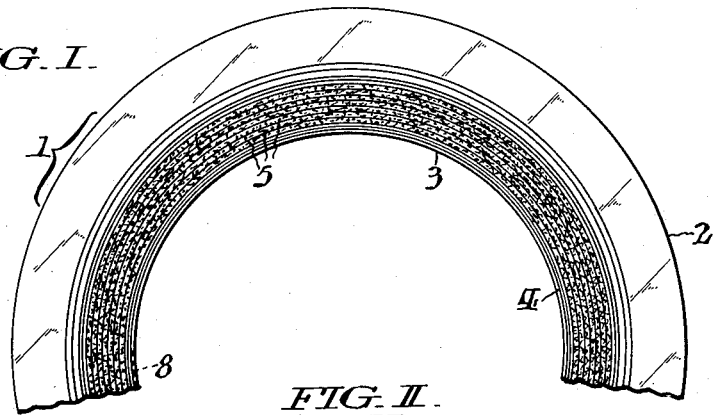
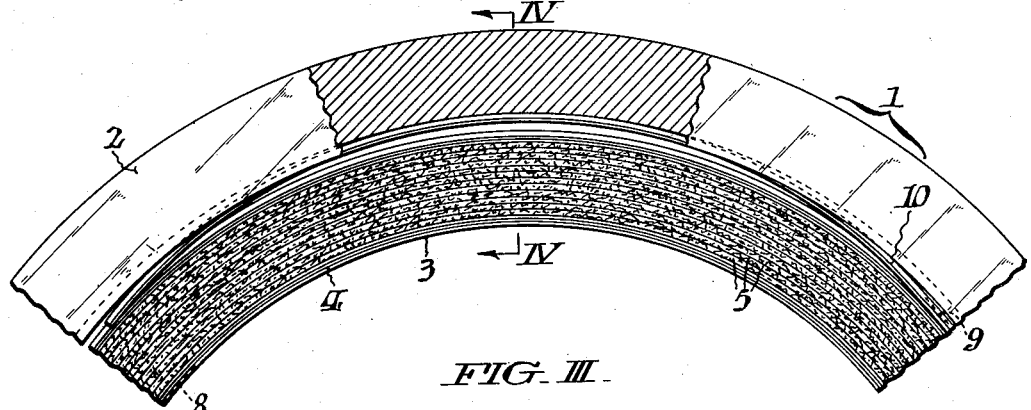
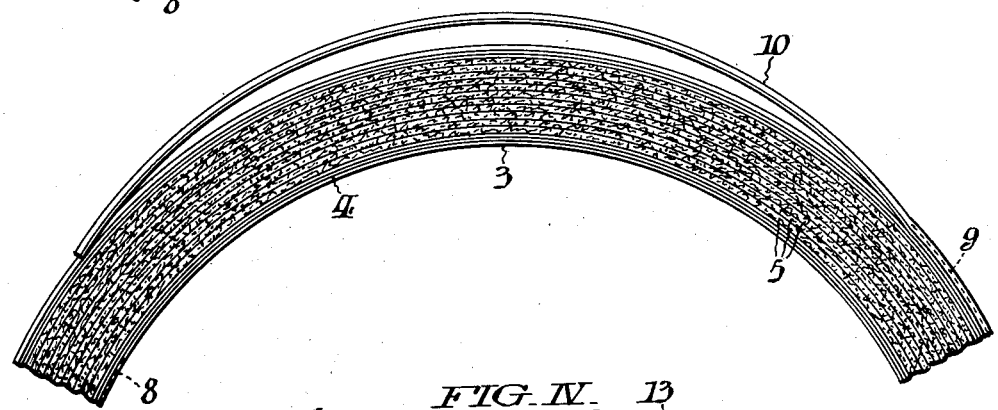
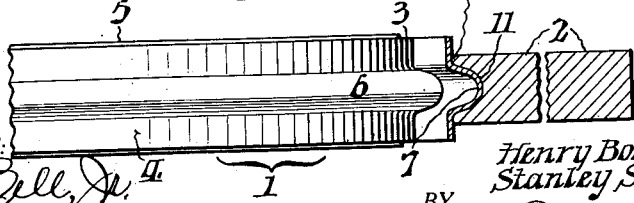
INVENTORS:
Henry Bohmer, Jr., &
Stanley S. Lippincott,
BY
ATTORNEYS.

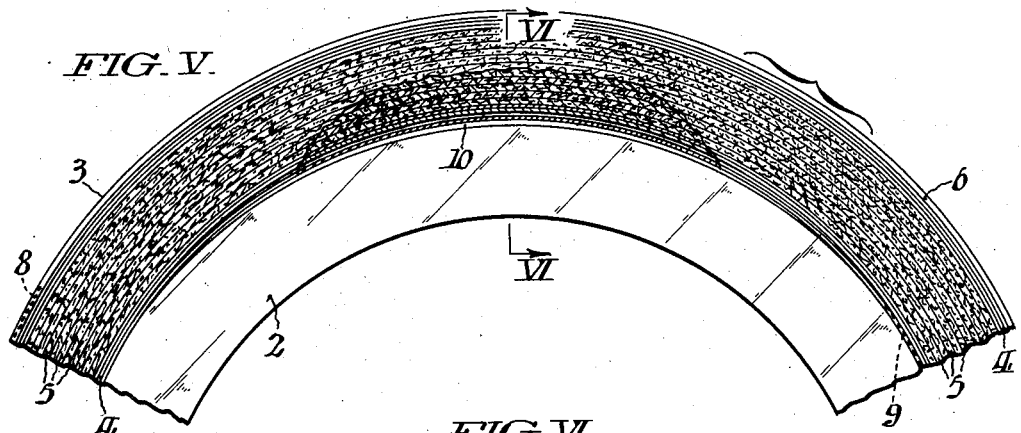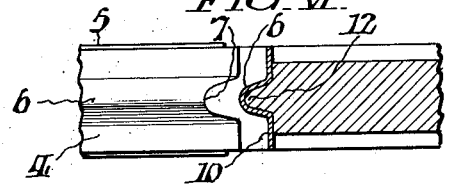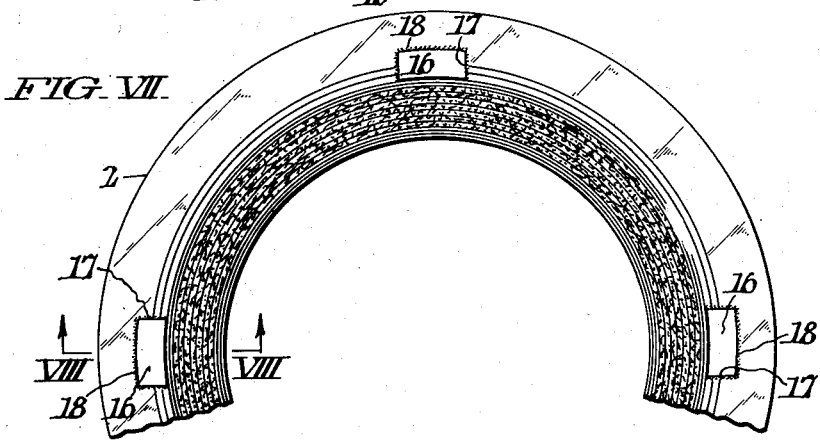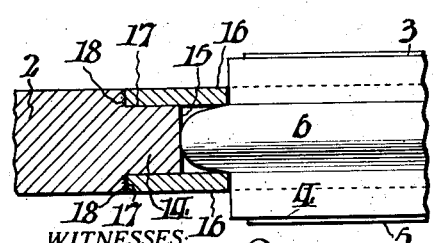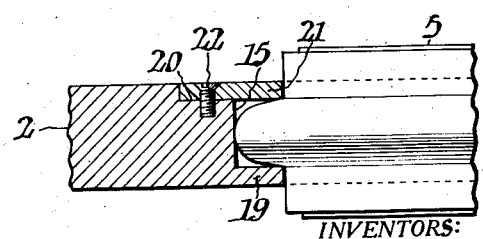

Patented May 7, 1940

2,200,212

UNITED STATES PATENT OFFICE 2,200,212

GASKET

Henry Bohmer, Jr., Riverton, and Stanley S. Lippincott, Palmyra, N. J., assignors to "Flexitallic" Gasket Company, Camden, N. J., a corporation of New Jersey Application October 25, 1939, Serial No. 301,094

7 Claims. (Cl. 288—27)

This invention relates to gaskets comprising a packing component and means for determining and limiting the bonding pressure on the former to prevent injurious overloading of the gasket. More specifically, the present application for a patent is a continuation in part of our prior application, Serial No. 199,896, filed April 4, 1938, which was allowed September 16, 1939.

The primary aim of the present improvements is to provide a gasket comprising a compressible component and a rigid or non-compressible component with appropriate means whereby the first mentioned component is interengageable with, and releasable from, the second mentioned component.

Another object is to provide a gasket of the above indicated type comprising a solid ring and a compressible annular packing ring which are interlockable in the common central plane, said compressible ring being releasable for replacement as service conditions may require.

A further object is to provide a gasket of the typified specie, the packing component whereof is adapted for connective assembly to and removal from the solid component with preassurance of its firm retention in service position.

With the foregoing objects and ancillary advantages in view, this invention comprises the novel features of construction, combination and arrangement of parts, such as are set forth with particularity in the following explanation thereof, when read in conjunction with the accompanying drawings, and as more tersely defined in the concluding claims.

In the drawings:

Fig. I is a broken plan view of one form of gasket in accordance with the present improvements.

Fig. II is a fragmentary face view of the gasket shown in the preceding figure, with one of the components partially broken away and in section along the central plane of said gasket, said view being drawn to a larger scale.

Fig. III is a view similar to Fig. II, with one of the gasket components omitted.

Fig. IV is a part elevation and part sectional view, taken on the plane IV—IV of Fig. II, but drawn to a larger scale for clearer illustration of the details.

Fig. V is a broken fragmentary plan view showing an alternative arrangement of the gasket components.

Fig. VI is a section on the plane VI—VI of Fig. V.

Fig. VII is a view along the lines of Fig. I, showing a modified form of the invention.

Fig. VIII is a section on the plane VIII—VIII of Fig. VII; and,

Fig. IX is a view somewhat similar to the preceding of a slight variation in the packing ring attaching means.

In the following description of the embodiments of this invention, shown by the drawings, corresponding reference characters are applied to similar parts, and specific terms are employed for the sake of clarity. It is to be understood, however, that such terms are non-limitatively used, but are intended to include all technical equivalents serving to accomplish an analogous purpose.

Referring more in detail to the drawings, the improved gasket 1 of this invention comprises a solid ring 2, with an interengaged and concentric compressible packing ring 3; the latter being, preferably, of greater thickness than the former. The ring 2 is made of durable non-compressible flat metal to serve as a stop piece for limiting the compressive pressure applied to a gasket when secured in a pipe joint, for example.

As shown, the packing ring 3 is, conveniently, composed of thin flexible metal strip 4 alternating with asbestos strip 5, said metal strip being longitudinally expanded outwards to provide a surrounding rib 6 and an interior groove 7, when both strips 4, 5 are spirally interengaged to form the packing ring 1, in accordance with known practice.

In the embodiment of Figs. I–IV, the inner end of the metal strip 4 is permanently secured to the immediately adjoining convolutions as indicated at 8; whereas the outer convolution is similarly secured at 9 to provide a substantial springy free portion or unattached arcual extension 10 prolonged beyond the region of attachment at 9 to the underlying convolution. The inner edge of the solid ring 2 is centrally grooved at 11 to engage the packing ring rib 6 as best shown in Fig. IV; or said ring is formed with a circumferential rib 12 for analogous coaction with the packing ring interior groove 7, as illustrated in the alternative form of the invention shown by Figs. V and VI.

In practice, the outside diameter of the packing ring 3 over the rib 6 is slightly less than the inside diameter of the solid ring-groove flanking sides 13, see Fig. IV, so that by pressing the arcual extension 10 of said ring metal strip 4 against the adjoining convolution, the packing ring 3 can be readily inserted and snapped into retentive coaction with the solid ring groove 11', or interlock therewith, in an obvious manner. With equal facility the packing ring 3 may be released or disengaged from the solid ring 2, when desired for renewal or replacement purposes.

Referring more specifically to Figs. IV and V, the only distinction over the form of the invention shown by Figs. I-IV, is the disposition of the solid ring 2 within the packing ring 3, accordingly similar reference characters are applied in order to avoid unnecessary repetitive explanation.

Referring to Figs. VII and VIII, it will be seen the solid ring 2 is interiorly provided with a relatively inset, rectangular section rib 14, and that the packing ring 3, made as before described in connection with Figs. I-IV, inclusive, is engaged by its surrounding rib 6 in the bore 15 of the ring 2. Means, such as circumferentially spaced tabs 16 seated in complemental recesses 17 to project over the packing ring rib 6 serve to interlock the packing ring 3 with the solid ring 2; while said tabs 16 are secured in place by any appropriate means such as tack welds 18.

In Fig. IX, the solid ring 2 is counterbored to define the rib 14 and an integral flange 19, as well as an associated interior groove 20 for reception of retainer tabs as described in the preceding paragraph; or, as shown an annular ring 21 may be secured in place by circumferentially spaced screws 22, threadedly engaged through said ring and into the rib 14.

Gaskets 1, constructed as above described with the free arcual extension 10 of the packing ring strip metal 4, are susceptible of quick assembly exteriorly or interiorly of the solid rings 2, with provision for easy replacement of the packing ring 3 as occasion requires, which obviously conduces to considerable economy as the solid or retainer rings 2 being non-compressible can be used indefinitely. Furthermore, gaskets, embodying the present invention may be originally installed, removed and replaced with positive preassurance of occupying the desired sealing position relative to the joints in which they are installed. For instance, if the over-all diameter of the gasket 1 is such as to come snugly within the joint securing means such as bolts, said bolts may be initially drawn-up, as usual, by "going around the joint" with a wrench until the packing ring 3 is surroundingly clamped, whereupon such operation is continued until an unyielding resistance is detected by compression of said packing ring to the thickness of the solid non-yielding ring 2, which indicates the packing ring 3 has everywhere been compressed to the correct joint-bonding pressure.

From the foregoing the merits and advantages of the improved gaskets will be clearly understood, but it is desired to again emphasize, in conclusion, the assembly advantages inhering to provision of the packing ring arcual extension 10, and the use of the cooperative interlockable solid ring 2.

Having thus described my invention, I claim:

1. A gasket comprising a solid compression-limiting ring and an inter-engaged compressible packing ring; the packing ring consisting of spirally-wound longitudinally recessed strip metal defining a rib along one face with an opposing groove along the other, and alternating asbestos strip; said packing ring having one extremity of the metal strip permanently secured to the adjoining convolution, with the other end portion similarly secured remote from its extremity to provide a free springy prolongation; and the solid ring being interlockable with the packing ring by edge engagement with the latter and with the springy prolongation.

2. A gasket as defined in claim 1 wherein the compression limiting ring is made in the form of a flat metal annulus with a continuous groove in the inner central plane thereof, and the interior diameter of said annulus is slightly greater than the over-all outside diameter of the packing ring to facilitate insertion and removal of such packing ring relative to the flat metal annulus.

3. A gasket as defined in claim 1 wherein the packing ring metal strip prolongation is in the form of an arcual springy extension, the compression limiting ring is provided with an inner relatively stepped rib for engagement with the packing ring surrounding bead, and planarly spaced retainer means secure the packing ring to the compression limiting ring.

4. A gasket as defined in claim 1 wherein the compression limiting ring is formed with an inner rectangular-section rib of less thickness than said ring, circumferentially spaced recesses in the ring and co-planarly related to the rib, and complemental tabs secured in said recesses projecting over the rib to interlock the packing ring with the compression limiting ring.

5. A gasket as defined in claim 1 wherein the compression limiting ring is counterbored to define a concentric inner flange, medial rib, and an annular recess, a secondary ring seating in the limiting ring recess for inter-locking coaction with the packing ring, and means for removably attaching said secondary ring to the compression limiting ring medial rib.

6. A packing ring for gaskets including a compression-limiting circumferentially-grooved component, said ring consisting of spirally wound longitudinally grooved strip metal with alternating asbestos strip, the strip metal having one extremity permanently secured to the adjoining convolution with the other end portion similarly attached remote from its extremity to provide a springy prolongation, and said prolongation being spaced from the adjoining convolution over a portion of its extent for interengagement of the packing ring with the compression limiting component.

7. A packing ring for gaskets as defined in claim 6 wherein the inner end of the strip metal is permanently secured to the adjoining convolutions, and the springy prolongation is in the form of an outer unattached arcual extension.

HENRY BOHMER, Jr.
STANLEY S. LIPPINCOTT.